United States Patent
Han et al.

(10) Patent No.: US 7,683,971 B2
(45) Date of Patent: Mar. 23, 2010

(54) IMAGE CONVERSION APPARATUS TO PERFORM MOTION COMPENSATION AND METHOD THEREOF

(75) Inventors: Seung-hoon Han, Suwon-si (KR);
Seung-joon Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 11/415,095

(22) Filed: May 2, 2006

(65) Prior Publication Data

US 2006/0250521 A1    Nov. 9, 2006

Related U.S. Application Data

(60) Provisional application No. 60/678,177, filed on May 6, 2005.

(30) Foreign Application Priority Data

Dec. 6, 2005    (KR) ...................... 10-2005-0118378

(51) Int. Cl.
   *H04N 7/01* (2006.01)
(52) U.S. Cl. ...................... 348/452; 348/458
(58) Field of Classification Search .......... 348/441–459
   See application file for complete search history.

(56) References Cited

U.S. PATENT DOCUMENTS 5,428,399 A * 6/1995 Robinson et al. ............ 348/459
5,864,368 A * 1/1999 Kato et al. ................... 348/446
6,014,182 A * 1/2000 Swartz ........................ 348/700
6,784,921 B2 * 8/2004 Lim, III ........................ 348/97

FOREIGN PATENT DOCUMENTS

| JP | 07-095441 A | 4/1995 |
| JP | 2000-341648 A | 12/2000 |
| KR | 2000-076094 A | 12/2000 |
| KR | 2004-065255 A | 7/2004 |
| KR | 10-2005-0025086 A | 3/2005 |

* cited by examiner

*Primary Examiner*—M. Lee
(74) *Attorney, Agent, or Firm*—Sughrue Mion, PLLC

(57) ABSTRACT

An image conversion apparatus to perform a motion compensation and a motion compensation method. The image conversion apparatus includes a first buffer, a second buffer, and a third buffer that store sequentially incoming video fields in sequence, a motion estimator that estimates a motion vector between a first field stored in the first buffer and a third field stored in the third buffer, a motion compensator that compensates for a motion between the first field and the third field using the motion vector output from the motion estimator and thereby outputs an interpolated field, an output unit that outputs at least one of the interpolated fields output from the motion compensator and a second field stored in the second buffer, and a field selector that selects a field to be output from the output unit according to a film mode of the sequentially incoming video fields.

19 Claims, 8 Drawing Sheets f(K-1)　　INTERPOLATED f(K)　　f(K+1)

IMAGE CONVERSION APPARATUS TO PERFORM MOTION COMPENSATION AND METHOD THEREOF

CROSS REFERENCE TO RELATED APPLICATIONS

This application claims priority from U.S. Provisional Application No. 60/678,177, filed on May 6, 2005, and Korean Patent Application No. 10-2005-0118378, filed on Dec. 6, 2005, in the Korean Intellectual Property Office, the disclosures of which are incorporated herein by reference.

BACKGROUND OF THE INVENTION

1. Field of the Invention

Apparatuses and methods consistent with the present invention relate to a motion compensation, and more particularly, to performing a motion compensation to prevent a motion-induced distortion from occurring during 3:2 pull down and 2:2 pull down.

2. Description of the Related Art

As large-sized display devices such as plasma display panels (PDP) and liquid crystal display (LCD) devices are coming into increasing use in recent years, many users are able to enjoy movies at home through the large-sized display devices as if they are in movie theaters.

Film projected at movie theaters runs at 24 or 25 frames per second. The created frames are stored in films and are displayed on a screen in a progressive scan method. The progressive scan method refers to a method that displays a single scene on a screen in a single time in the unit of frame.

Most display devices currently used adopt an interlaced scan method which is in contrast to the progressive scan method. The interlaced scan method divides a single scene into at least two fields and displays the divided fields on a screen in sequence. Such display devices process and display images in different ways according to their respective transmission standards. For example, according to the national television system committee (NTSC), the display device processes an image with 60 fields per second, and according to the phase alternation line (PAL) or sequential couleur a memoire (SECAM), the display device processes an image with 50 fields per second.

If the film is reproduced on an interlaced display device, a user suffers from a rapid moving of images due to the difference in the number of frames displayed per second. Accordingly, in order to reproduce the film through the interlaced display device, the display device has to increase the number of fields using an image conversion apparatus such as telecine (which is a compound word of "television" and "cinema").

More specifically, in order to display a film on an NTSC display device, 24 frames per second have to be increased to 60 fields, and in order to display a film on a PAL or SECAM display device, 25 frames per second have to be increased to 50 fields. These operations are referred to as 3:2 pull down and 2:2 pull down. Meanwhile, in order to display a pull down image format on a progressive display device, an inverse telecine process is required.

FIGS. 1A and 1B are views illustrating a conventional image format conversion method.

In FIGS. 1A and 1B, T1 denotes a top field of a frame 1 and B1 denotes a bottom field of the frame 1, T2 denotes a top field of frame 2 and B2 denotes a bottom field of the frame 2, T3 denotes a top field of a frame 3 and B3 denotes a bottom field of the frame 3, and T4 denotes a top field of a frame 4 and B4 denotes a bottom field of the frame 4.

Referring to FIG. 1A, 5 fields are obtained from 2 frames such that 60 fields are obtained from 24 frames per second. More specifically, 3 fields are obtained from each of the frame 1 and the frame 3, and 2 fields are obtained from each of the frame 2 and frame 4. Herein, either the top field or the bottom field is repeated such that 3 fields can be obtained from one frame of a film.

The video fields obtained by performing the 3:2 pull down are converted into progressive frames using an inverse telecine process. More specifically, the top field T1 and the bottom field B1 are combined to create 3 frames, the top field T2 and the bottom field B2 are combined to create 2 frames, the top field T3 and the bottom field B3 are combined to create 3 fields, and the top field T4 and the bottom field B4 are combined to create 2 fields.

Referring to FIG. 1B, 2 fields are obtained from 1 frame such that 50 fields are obtained from 25 frames per second. That is, a top field and a bottom field are obtained from each frame. The video fields obtained by performing the 2:2 pull down are converted to progressive frames using an inverse telecine process. That is, the top field and the bottom field are combined to create two frames.

According to the image format conversion method as described above, two or three frames have the same motion phase. For example, the frames T1+B1, B2+T2, B3+T3, and T4+B4 have the same motion phase.

When the progressive frames generated using the inverse telecine process are displayed on a screen, two or three frames are repeatedly displayed on the screen, which causes a motion judder. In order to prevent the motion judder, a motion compensation is performed. The motion compensation estimates a motion based on adjacent images and creates an intermediate image. The motion compensation is disclosed in the U.S. Pat. No. 5,929,919, titled "Motion-compensated Field Rate Conversion".

However, in U.S. Pat. No. 5,929,919, since the motion compensation is performed with respect to all of the incoming fields during the 3:2 pull down, a motion estimation error-induced distortion, such as halo, block effect, and false matching, is likely to occur. Also, a fall-back detection circuit to perform a motion refinement for the more accurate motion detection is additionally required.

SUMMARY OF THE INVENTION

The present invention provides an image conversion apparatus and a motion compensation method thereof which selects only a field to be motion-compensated and performs a motion compensation for the field in order to prevent a motion judder.

The present invention also provides an image conversion apparatus and a motion compensation method thereof which perform a motion compensation using a block matching algorithm to prevent a motion-induced distortion, without requiring an additional circuit.

According to an aspect of the present invention, there is provided an image conversion apparatus including a first buffer, a second buffer, and a third buffer that store sequentially incoming video fields in sequence, a motion estimator that estimates a motion vector between a first field stored in the first buffer and a third field stored in the third buffer, a motion compensator that compensates for a motion between the first field and the third field using the motion vector output from the motion estimator and thereby outputs an interpolated field, an output unit that outputs at least one of the interpolated field output from the motion compensator and a second field stored in the second buffer, and a field selector that selects a field to be output from the output unit according to a film mode of the sequentially incoming video fields.

Preferably, but not necessarily, the field selector includes a film mode determiner that determines whether the sequentially incoming video fields are in a 3:2 pull down film mode, a 2:2 pull down film mode, or not in a pull down film mode, and a selection signal output unit that outputs a selection signal to select one of the interpolated field and a second field stored in the second buffer according the determination of the film mode determiner.

Preferably, but not necessarily, if the sequentially incoming video fields are in the 3:2 pull down mode, the selection signal output unit outputs a selection signal to control the output unit to output a last fields of repeated fields of the sequentially incoming fields as the interpolated field.

Preferably, but not necessarily, if the sequentially incoming video fields are in the 2:2 pull down film mode, the selection signal output unit outputs a selection signal to control the output unit to output the interpolated field in every second field.

Preferably, but not necessarily, if the sequentially incoming fields are not in a pull down film mode, the selection signal output unit outputs a selection signal to control the output unit to output the second field which is not interpolated.

Preferably, but not necessarily, the motion estimator estimates a motion by performing a block matching algorithm.

Preferably, but not necessarily, the motion estimator estimates a motion by using the following equation that linearly approximates to the Lorentzian function:

$$E_m(v_m) = \sum_{x \in R(B_m)} \varphi_D(f_{k+1}(x) - f_{k-1}(x - v_m)) + \lambda_m \sum_{v' \in V_N(m)} \varphi_s(v' - v_m)$$

wherein $f_{k+1}(x)$ denotes a pixel value in an image coordinate vector 'x' of a field k+1 (that is, the third field), $V_m$ denotes a motion vector of a current block 'm', R(Bm) denotes the union of sets image coordinate vectors of the block 'm' in the third field, $V_N(m)$ denotes the unit of sets neighboring blocks around the current block 'm', $\lambda_m$ denotes a motion smoothness weight, $\phi_s$ denotes a motion smoothness error function, and $\phi_D$ denotes a matching error function.

Preferably, but not necessarily, at least one of the motion smoothness error function and the matching error function is calculated using the following equation:

$$\varphi = \left| \frac{Lorentizian(T, \sigma)}{T} \right|_{if|x|<T}$$

otherwise φ=Lorentzian(T,σ)

wherein T denotes a maximum pixel value.

Preferably, but not necessarily, the motion smoothness weight adaptively varies depending on a block.

Preferably, but not necessarily, the motion compensator performs a bilinear interpolation.

According to an aspect of the present invention, there is provided a method for converting an image format of an image conversion apparatus having a first buffer through a third buffer. The method includes sequentially storing video fields in the first buffer through the third buffer, calculating a motion vector using fields stored in the first and the third buffers, interpolating fields stored in the first and the third buffers using the motion vector, determining a film mode of the video fields, and outputting either a field stored in the second buffer or the interpolated field according to the film mode.

Preferably, but not necessarily, the operation of outputting either one field outputs a last one of repeated fields of the video fields as the interpolated field if the video fields are in a 3:2 pull down film mode.

Preferably, but not necessarily, the operation of outputting either one field outputs the interpolated field in every second field if the video fields are in a 2:2 pull down film mode.

Preferably, but not necessarily, the operation of outputting either one field outputs a field stored in the second buffer if the video fields are not in a pull down film mode.

Preferably, but not necessarily, the operation of calculating the motion vector estimates a motion by performing a block matching algorithm.

Preferably, but not necessarily, the operation of calculating the motion vector estimates a motion by using the following equation that linearly approximates to the Lorentzian function:

$$E_m(v_m) = \sum_{x \in R(B_m)} \varphi_D(f_{k+1}(x) - f_{k-1}(x - v_m)) + \lambda_m \sum_{v' \in V_N(m)} \varphi_s(v' - v_m)$$

wherein $f_{k+1}(x)$ denotes a pixel value in an image coordinate vector 'x' of a field k+1 (that is, the third field), $V_m$ denotes a motion vector of a current block 'm', R(Bm) denotes the union of sets image coordinate vectors of the block 'm' in the third field, $V_N(m)$ denotes the unit of sets neighboring blocks around the current block 'm', $\lambda_m$ denotes a motion smoothness weight, $\phi_s$ denotes a motion smoothness error function, and $\phi_D$ denotes a matching error function.

Preferably, but not necessarily, at least one of the motion smoothness error function and the matching error function is calculated using the following equation:

$$\varphi = \left| \frac{Lorentizian(T, \sigma)}{T} \right|_{if|x|<T}$$

otherwise φ=Lorentzian(T,σ)

wherein T denotes a maximum pixel value.

Preferably, but not necessarily, the motion smoothness weight adaptively varies depending on a block.

Preferably, but not necessarily, the operation of interpolating the motion performs a bilinear interpolation.

BRIEF DESCRIPTION OF THE DRAWINGS

This and other aspects of the present invention will become apparent and more readily appreciated from the following description of the exemplary embodiments, taken in conjunction with the accompanying drawings of which.

DETAILED DESCRIPTION OF AN EXEMPLARY EMBODIMENT

The matters exemplified in this description are provided to assist in a comprehensive understanding of an exemplary embodiment of the present invention disclosed with reference to the accompanying figures. Accordingly, those of ordinary skill in the art will recognize that various changes and modifications of the exemplary embodiment described herein can be made without departing from the scope and spirit of the claimed invention. Descriptions of well-known functions and constructions are omitted for clarity and conciseness.

Figure 1A:
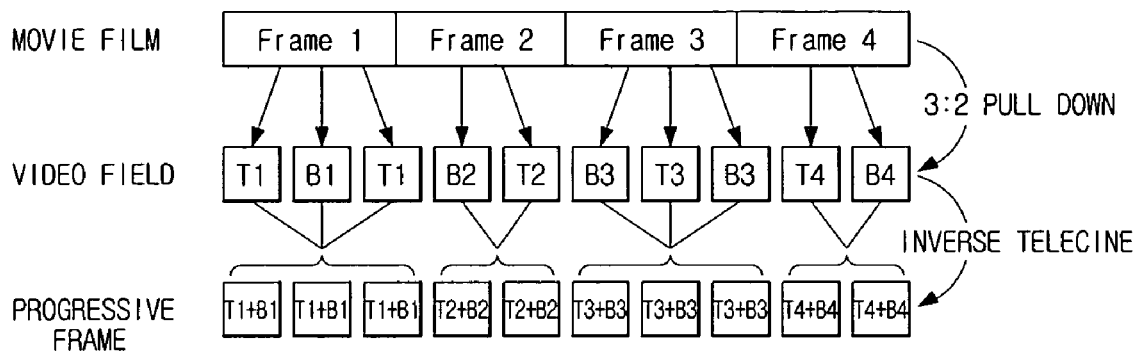
FIGS. 1A and 1B are views illustrating a conventional image format conversion method.
Figure 1B:
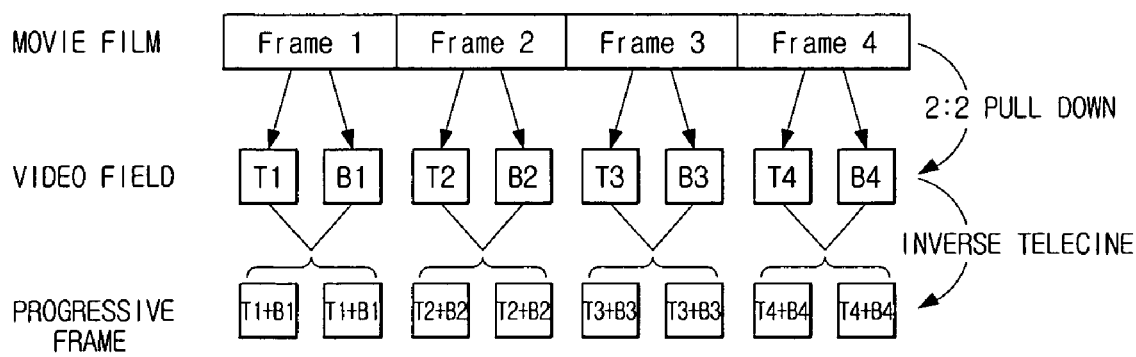
Figure 2:
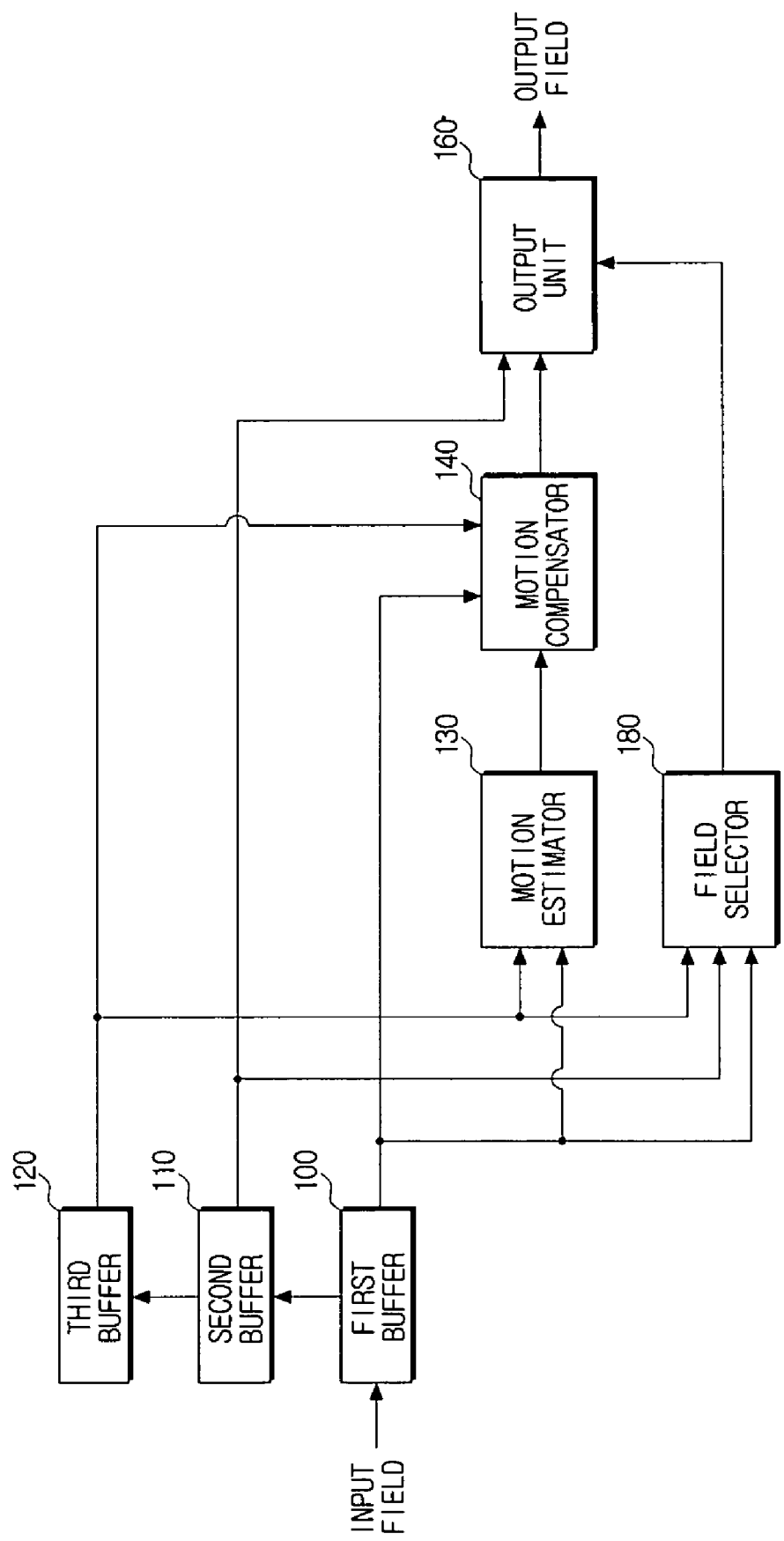
FIG. 2 is a block diagram illustrating an image conversion apparatus according to an exemplary embodiment of the present invention.

FIG. 2 is a block diagram illustrating an image conversion apparatus according to an exemplary embodiment of the present invention.

Referring to FIG. 2, the image conversion apparatus comprises a first buffer 100, a second buffer 110, a third buffer 120, a motion estimator 130, a motion compensator 140, an output unit 160, and a field selector 180.

The first, second and third buffers 100, 110, and 120 store 60 video fields (NTSC) or 50 video fields (PAL), which are input in sequence. More specifically, a first field is stored in the first buffer 100, a second field is stored in the second buffer 110, and a third field is stored in the third buffer 120. Herein, if the second field is represented by "k", the first field is "k−1" and the third field is "k+1".

The motion estimator 130 divides one field into M×N blocks and estimates a motion vector between the first field stored in the first buffer 100 and the third field stored in the third buffer 120. The motion estimator 130 performs a block matching algorithm (BMA) based on a sum of absolute differences (SAD).

In an assumption that there is no abrupt change in motion around a block intended for motion vector estimation, the Lorentzian function defined by the following Equation 1 is used as a block matching error function and a motion smoothness error function to perform the BMA.

$$Lorentzian(x, \sigma) = \log\left(1 + 0.5\frac{x^2}{\sigma^2}\right)$$ [Equation 1]

The motion vector estimation performed by the motion estimator 130 will be described in detail with reference to FIGS. 5 to 6C below.

The motion compensator 140 performs a bilinear interpolation expressed by the following Equation 2 using the motion vector estimated by the motion estimator 130, and outputs a motion-interpolated field.

$$f_k(x) = \frac{f_{k+1}\left(x + \frac{v_m}{2}\right) + f_{k-1}\left(x - \frac{v_m}{2}\right)}{2}$$ [Equation 2]

wherein, $f_k(x)$ denotes a pixel value in an image coordinate vector "x" of a field "k", and $v_m$ denotes a final motion vector estimated by the motion estimator 130.

The output unit 160 selects one of the second field output from the second buffer 110 and the motion-interpolated field output from the motion compensator 140 according to a selection signal of the field selector 180, which will be described below.

The field selector 180 outputs a selection signal to control the output unit 160. For example, if incoming fields are in a 3:2 pull down film mode, the field selector 180 outputs a selection signal to select a motion-interpolated field with respect to only the last field of the repeated fields. If incoming fields are in a 2:2 pull down film mode, the field selector 180 outputs a selection signal to select a motion-interpolated field in every second fields.

Figure 3:
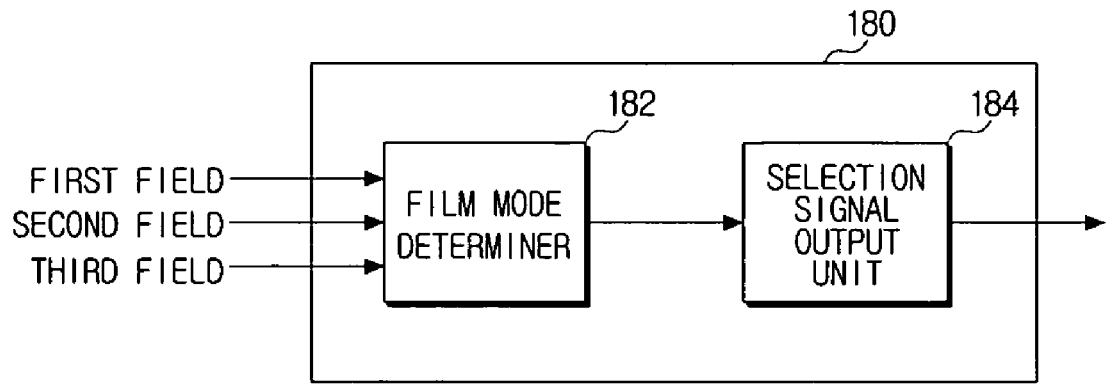
FIG. 3 is a block diagram illustrating a field selector of the image conversion apparatus according to an exemplary embodiment of the present invention.

FIG. 3 is a block diagram illustrating the field selector of the image conversion apparatus according to an exemplary embodiment of the present invention.

Referring to FIG. 3, the field selector 180 comprises a film mode determiner 182 and a selection signal output unit 184.

The film mode determiner 182 determines whether incoming fields are in a 3:2 pull down film mode, a 2:2 pull down film mode, or not in a pull down film mode.

If the film mode determiner 184 determines that the incoming fields are in the 3:2 pull down film mode, the selection signal output unit 184 outputs selection signals 0-0-1-0-1-0-0-1-0- . . . according to the incoming fields and performs a motion compensation with respect to only the last field of the repeated fields. The selection signal "0" is a command to output the field stored in the second buffer 110 as it is, instead of an interpolated field, and the selection signal "1" is a command to output an interpolated field output from the motion compensator 140.

If the film mode determiner 182 determines that the incoming fields are in a 2:2 pull down film mode, the selection signal output unit 184 outputs selection signals 0-1-0-1-0-1- . . . according to the incoming fields and performs a motion compensation in every second field. If the film mode determination unit 182 determines that the incoming fields are not in a pull down film mode, the selection signal output unit 184 outputs signals 0-0-0 . . . and does not perform a motion compensation. That is, the selection signal output unit 184 outputs the second field stored in the second buffer 110 as it is.

Figure 4A:
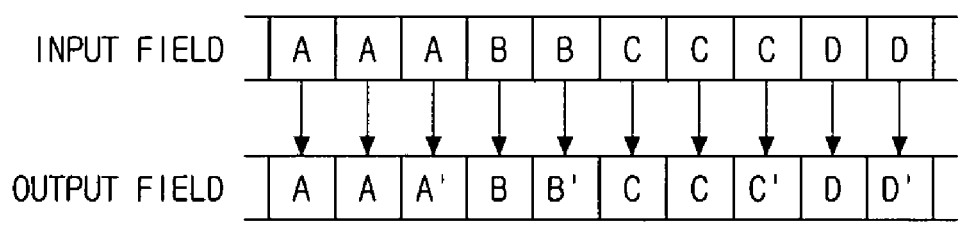
FIGS. 4A and 4B are views illustrating results of converting an image format of the image conversion apparatus according to an exemplary embodiment of the present invention.
Figure 4B:
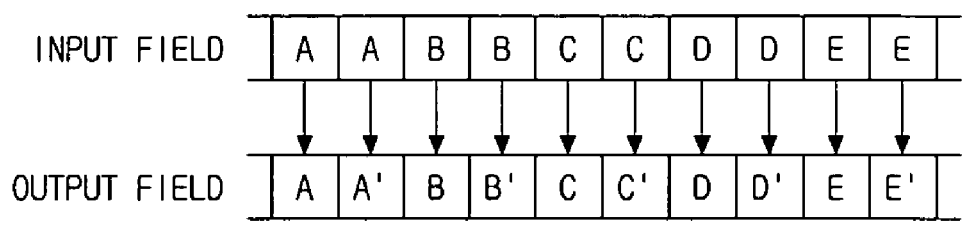

FIGS. 4A and 4B are views showing the results of converting an image format of the image conversion apparatus according to an exemplary embodiment of the present invention.

Referring to FIG. 4A, if the incoming fields are in a 3:2 pull down film mode, the last field of the repeated fields is motion-compensated and output. For example, if a field A is stored in the first and the second buffers 100 and 110 and a field B is stored in the third buffer 120, the field A stored in the second buffer 110 is not output and an interpolated field A' is output. In the same way, if fields B are stored in the first and the second buffers 100 and 110 and a field C is stored in the third buffer 120, the field B stored in the second buffer 110 is not output and an interpolated field B' is output.

FIG. 4B illustrates the case that the incoming fields are in a 2:2 pull own film mode. In this case, a motion compensation is performed in every second field. For example, if fields A are stored in the first and the second buffers 100 and 110 and a field B is stored in the third buffer 120, the field A stored in the second buffer 110 is not output and an interpolated field A' is output. In the same way, if fields B are stored in the first buffer 100 and the second buffer 110 and a field C is stored in the third buffer 120, the field B stored in the second buffer 110 is not output and an interpolated field B' is output.

With reference to FIG. 5 and FIGS. 6A to 6C, the operation of the motion estimator 130 of the image conversion apparatus according to an exemplary embodiment of the present invention will now be described.

Figure 5:
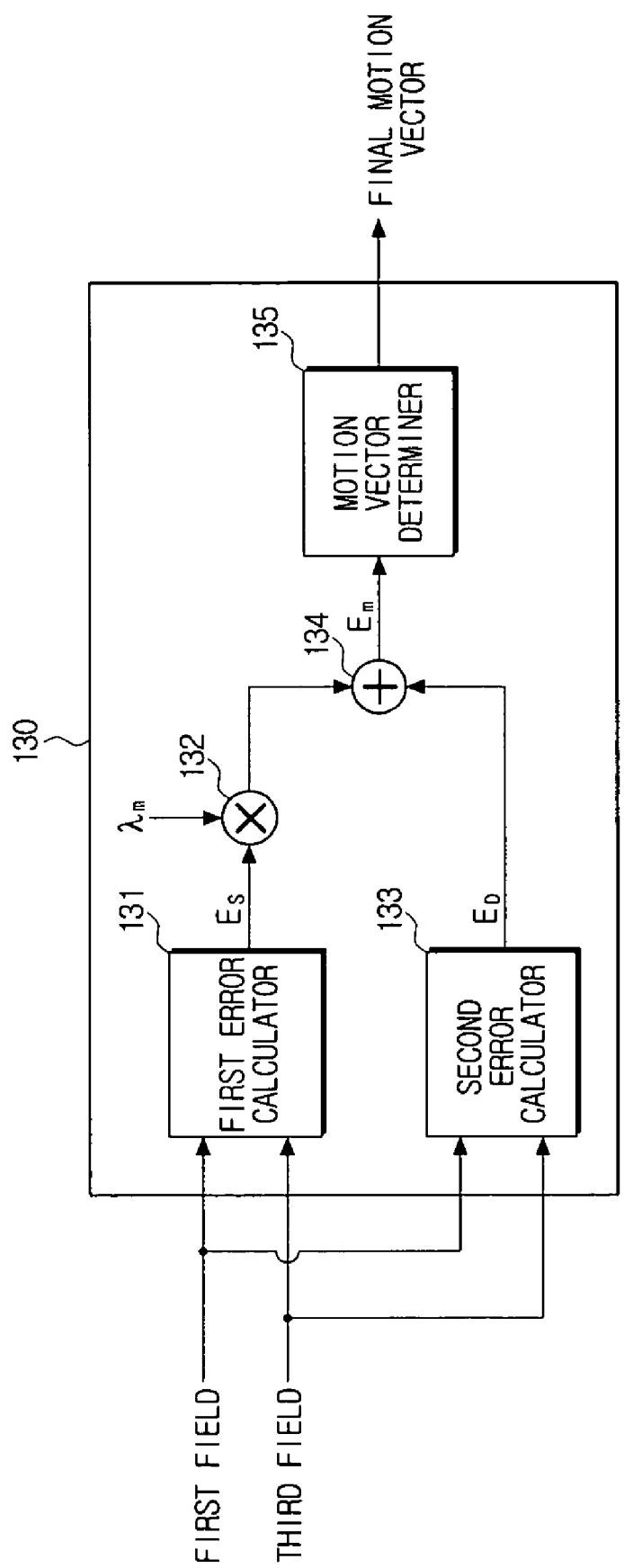
FIG. 5 is a block diagram illustrating a motion estimator of the image conversion apparatus according to an exemplary embodiment of the present invention.

Referring to FIG. 5, the motion estimator 130 comprises a first error calculator 131, a multiplier 132, a second error calculator 133, an adder 134, and a motion vector determiner 135.

The first error calculator 131 calculates a motion smoothness error $E_s$ between a first field and a third field. The method for calculating the motion smoothness error $E_s$ of the first error calculator 131 will be explained with reference to FIG. 6A in detail.

Figure 6A:
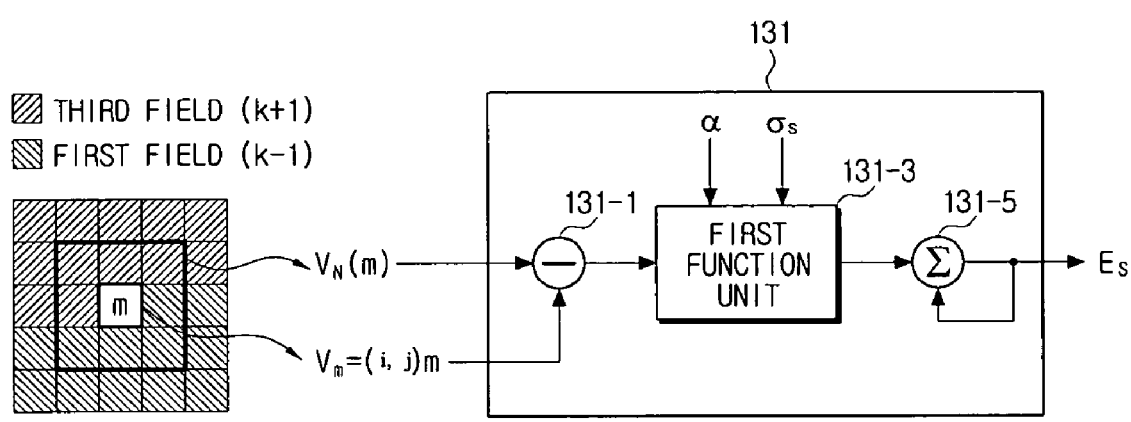
FIGS. 6A to 6C are views illustrating operation of the motion estimator of the image conversion apparatus according to an exemplary embodiment of the present invention.

Referring to FIG. 6A, the first error calculator 131 comprises a first subtraction unit 131-1, a first function unit 131-3, and a first sigma unit 131-5.

The first subtraction unit 131-1 calculates a motion vector difference between a current block "m" and each of neighboring blocks $V_N(m)$ around the current block "m". Herein, the current block "m" is located at (i,j) and the number of neighboring blocks is 8, where 4 of the neighboring blocks are included in the third field and the other blocks are included in the first field.

The first function unit 131-3 multiplies the calculated motion vector difference by a motion smoothness error function $\phi_S$. The motion smoothness error function $\phi_S$ is calculated based on the Lorentzian function defined by the above-described Equation 1 and expressed by the following Equation 3:

$$\varphi_S(x) = \left| \frac{Lorentzian(\alpha\sigma_S, \sigma_S)}{\alpha\sigma_S} x \right|_{if|x|<\alpha\sigma_S} \quad \text{[Equation 3]}$$

otherwise $\phi_S(x)=Lorentzian(\alpha\sigma_S,\sigma_s)$ wherein $\alpha$ denotes a scale constant and $\alpha\sigma_S$ denotes a maximum pixel value.

The first sigma 131-5 obtains the sum of the motion vector differences multiplied by the motion smoothness error function $\phi_S$, and thereby calculates the motion smoothness error $E_s$. The upper bound of the summation corresponds to the number of neighboring blocks. The motion smoothness error $E_s$ is expressed by the following Equation 4:

$$E_S(v_m) = \sum_{v' \in V_N(m)} \varphi_S(v' - v_m) \quad \text{[Equation 4]}$$

Referring back to FIG. 5, the multiplier 132 multiplies the calculated motion smoothness error $E_s$ by a weight $\lambda_m$ for the motion smoothness. The weight $\lambda_m$ for the motion smoothness varies depending on the characteristic of each block such as smoothness and texture, and one value is set for one field.

The second error calculator 133 calculates a block matching error $E_D$ between the first field and the third field. The method for calculating the block matching error $E_D$ of the second error calculator 133 will be explained in detail with reference to FIG. 6B.

Figure 6B:
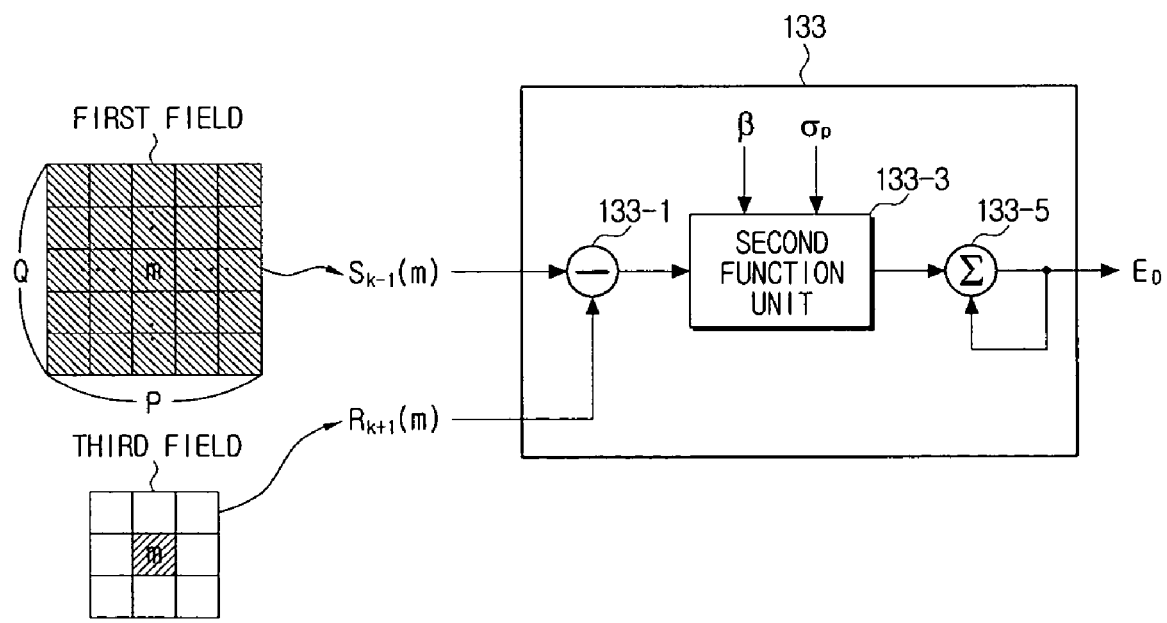

Referring to FIG. 6B, the second error calculator 133 comprises a second subtraction unit 133-1, a second function unit 133-3, and a second sigma unit 133-5.

The second subtraction unit 133-1 calculates a pixel value difference between a current block "m" of the third field and each of search blocks P×Q included in the first field. The current block "m" included in the third field is expressed by $R_{k+1}(m)$ and a certain block "m" of the search blocks included in the first field is expressed by $S_{k-1}(m)$.

The second function unit 133-3 multiplies the calculated pixel value difference by a matching error function $\phi_D$. The matching error function $\phi_D$ is calculated based on the Lorentzian function defined by the above-described Equation 1 and expressed by the following Equation 5:

$$\varphi_D = \left| \frac{Lorentzian(\beta\sigma_D, \sigma_D)}{\beta\sigma_D} x \right|_{if|x|<\beta\sigma_D} \quad \text{[Equation 5]}$$

otherwise $\phi_D(x)=Lorentzian(\beta\sigma_D,\sigma_D)$ wherein $\beta$ denotes a scale constant and $\beta\sigma_D$ denotes a maximum pixel value.

The second sigma unit 133-5 obtains the sum of the pixel value differences multiplied by the matching error function $\phi_D$, and thereby calculates the block matching error $E_D$. The upper bound of the summation corresponds to the number of the search blocks. The block matching error ED is expressed by the following Equation 6:

$$E_D(v_m) = \sum_{x \in R(B_m)} \varphi_D(f_{k+1}(x) - f_{k-1}(x - v_m)) \quad \text{[Equation 6]}$$

Referring back to FIG. 5, the adder 134 adds the motion smoothness error $E_S$ multiplied by the weight $\lambda_m$ and the block matching error $E_D$, and thereby calculates a motion vector error $E_m$ for one current block "m". The motion vector error Em is expressed by $E_m=E_D+\lambda_m E_S$.

The motion vector determiner 135 outputs an motion vector $v_m$ calculating the minimum error $E_m$ of the plurality of motion vector errors $E_m$ corresponding to the plurality of current blocks "m" included in one field, as a final motion vector. The motion vector in a certain block "m" of a field "k" is defined by the following Equation 7:

$$bmv(m,k)=\arg \min E_m(v_m) \quad \text{[Equation 7]}$$

wherein $E_m(v_m)$ is expressed by the following Equation 8 based on the above-described Equations 4 and 6:

$$E_m(v_m) = \quad \text{[Equation 8]}$$
$$\sum_{x \in R(B_m)} \varphi_D(f_{k+1}(x) - f_{k-1}(x - v_m)) + \lambda_m \sum_{v' \in V_N(m)} \varphi_S(v' - v_m)$$

As described above, the motion estimator 130 estimates the final motion vector using the Lorentzian function. FIG. 6C illustrates examples of the motion smoothness error function $\phi_S$ and the matching error function $\phi_D$.

Figure 6C:
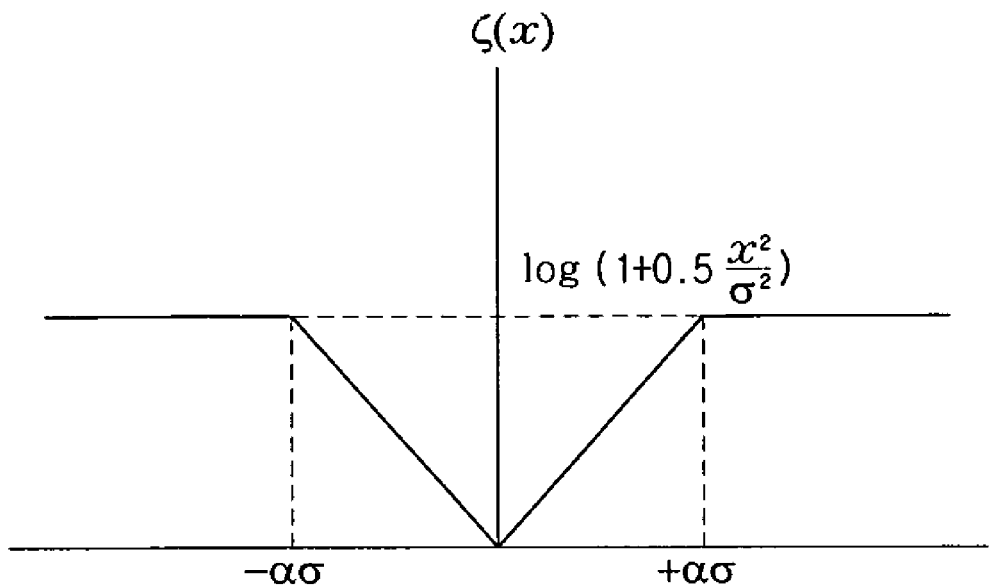

Referring to FIG. 6C, if a pixel value included in a certain field is less than the maximum pixel value (−ασ,ασ), a linear motion vector error $E_m$ is calculated according the Lorentzian function. If a pixel value included in a certain field is greater than or equal to the maximum pixel value (−ασ,ασ), all the motion vector errors $E_m$ have a value of $\log(1+0.5x^2/\sigma^2)$.

Figure 7:
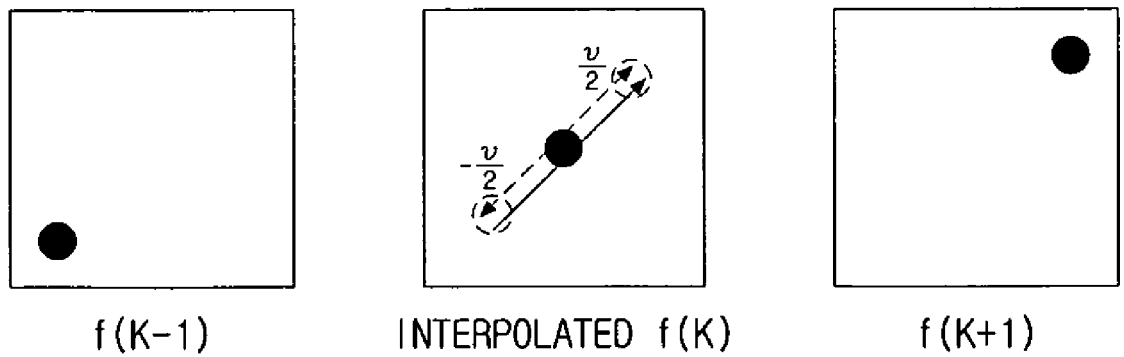
FIG. 7 is a view illustrating a result of motion compensation of a motion compensator of the image conversion apparatus according to an exemplary embodiment of the present invention.

FIG. 7 is a view illustrating results of motion compensation performed by the motion compensator 140 of the image conversion apparatus according to an exemplary embodiment of the present invention.

Referring to FIG. 7, a pixel value $f_k(x)$ in an image coordinate vector of an interpolated field is calculated by applying a pixel value $f_{k-1}(x)$ in an image coordinate vector of the first field and a pixel value $f_{k+1}(x)$ in an image coordinate vector of the third field to the Equation 2.

Figure 8:
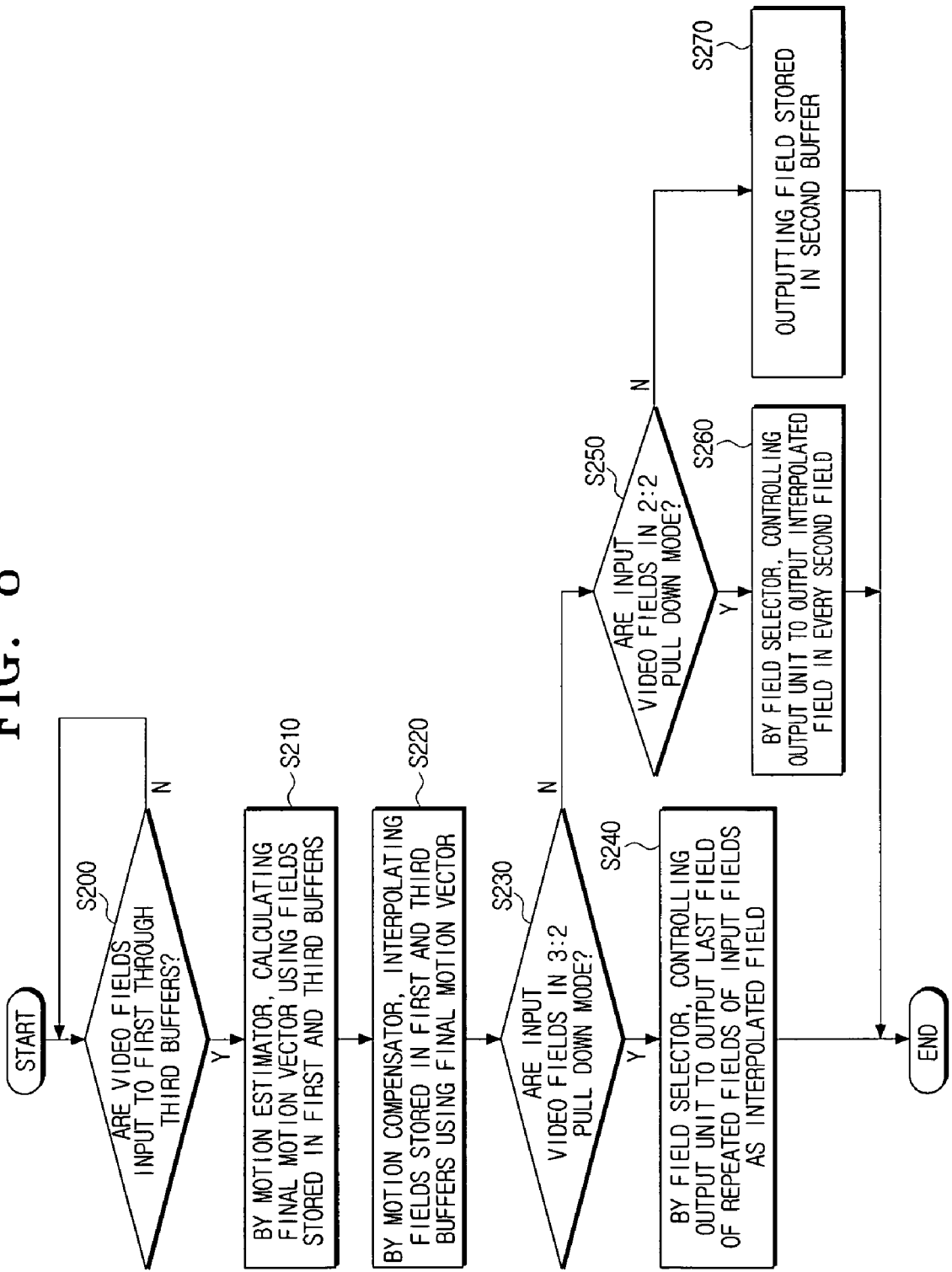
FIG. 8 is a flowchart illustrating operation of the image conversion apparatus according to an exemplary embodiment of the present invention.

FIG. 8 is a flowchart illustrating operation of the image conversion apparatus according to an exemplary embodiment of the present invention.

Referring to FIG. 8, when video fields are input to the first to the third buffers 100, 110, 120 at operation S200, the motion estimator 130 calculates a final motion vector using fields stored in the first buffer 100 and the third buffer 120 at operation S210. The motion estimator 130 uses the Lorentzian function to estimate the final motion vector.

The motion compensator 140 interpolates the fields stored in the first buffer 100 and the third buffer 120 using the final motion vector, and output interpolated fields at operation S220. The motion compensator 140 performs a bilinear interpolation.

If it is determined that the input fields are in a 3:2 pull down film mode at operation S230, the field selector 180 controls the output unit 160 to output the last field of the repeated input fields as an interpolated field at operation S240.

If it is determined that the input fields are in a 2:2 pull down film mode at operation S250, the field selector 180 controls the output unit 160 to output an interpolated field in every second field at operation S260.

If it is determined that the input fields are not in a pull down film mode at operation S250, the field selector 180 controls the output unit 160 not to output an interpolated field and to output the field stored in the second buffer 110 as it is at operation S270.

According to the above-described process, the motion compensation is selectively performed according to the film mode of the input fields.

Figure 9A:
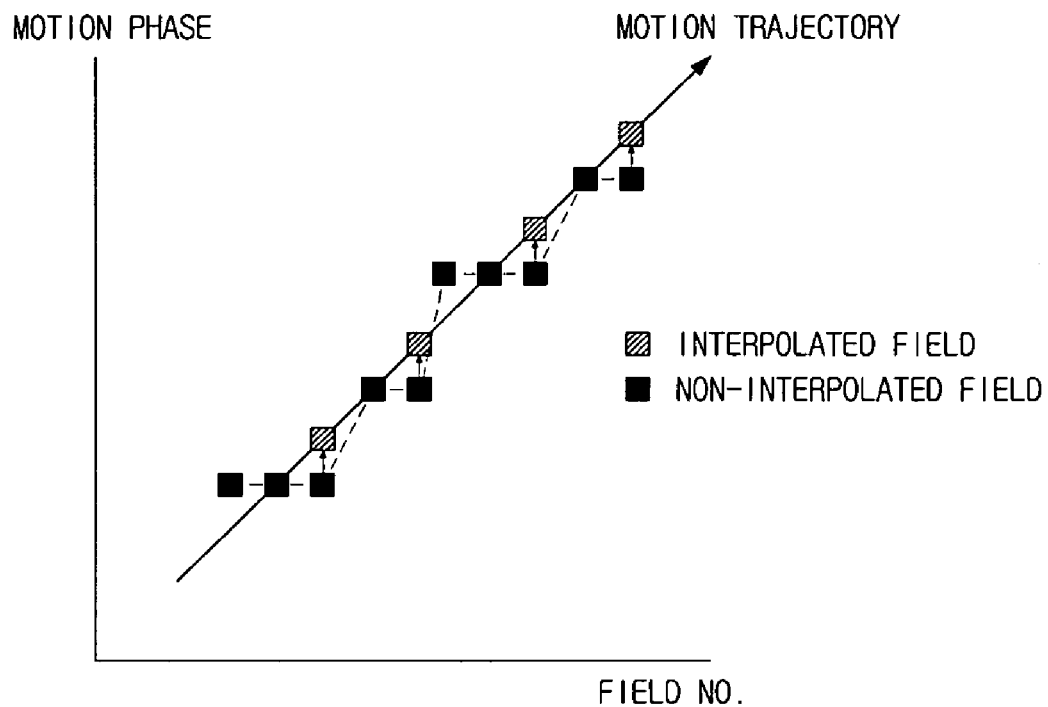
FIG. 9A to 9B are graphs illustrating results of motion compensation of the image conversion apparatus according to an exemplary embodiment of the present invention.
Figure 9B:
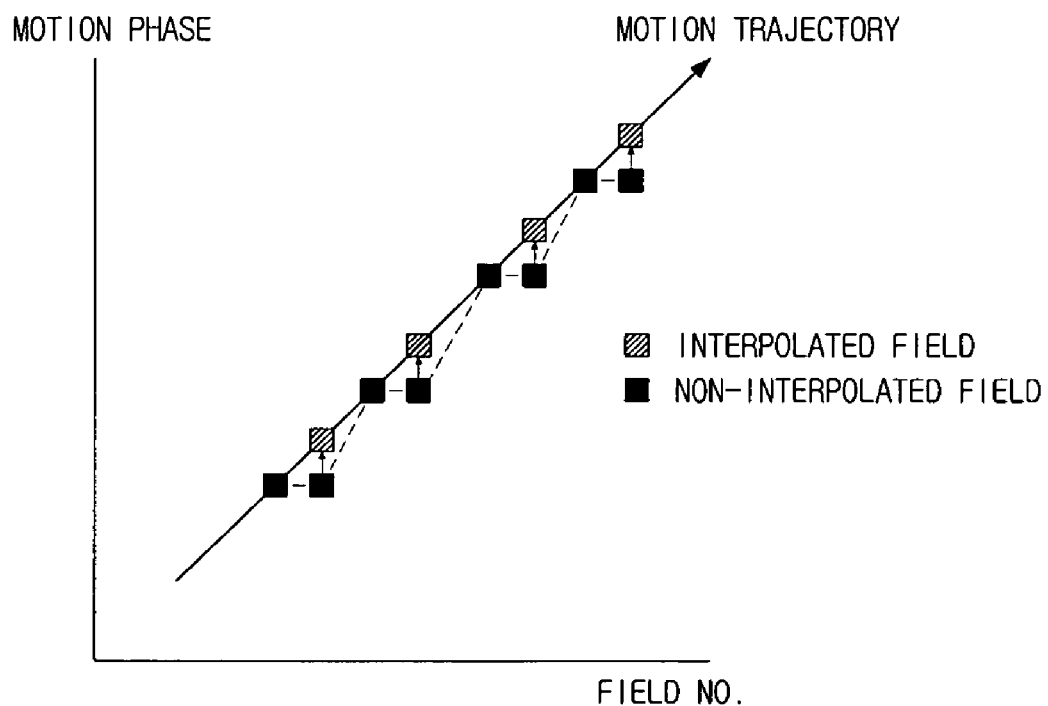

FIGS. 9A and 9B are graphs illustrating results of the motion compensation performed by the image conversion apparatus according to an exemplary embodiment of the present invention.

FIG. 9A is a one-dimensional graph illustrating motion-compensated fields in the 3:3 pull down film mode. According to the graph as shown in FIG. 9A, the last field of the repeated fields is output as an interpolated field and thus it is possible to reproduce an image similar to a motion trajectory.

FIG. 9B is a one-dimensional graph illustrating motion-compensated field in the 2:2 pull down film mode. According to the graph as shown in FIG. 9B, an interpolated field is output in every second field and thus it is possible to reproduce an image similar to a motion trajectory.

According to the present invention as described above, since only the field to be motion-compensated is selected using the block matching algorithm and motion-compensated, a motion judder caused by the pull down is prevented, and an extra motion refinement process and an additional hardware are not required. Also, since the Lorentzian function makes it possible to more accurately estimate a motion, a motion-induced distortion can be prevented.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image conversion apparatus comprising:
a first buffer, a second buffer, and a third buffer that store sequentially incoming video fields in sequence;
a motion estimator that estimates a motion vector between a first field stored in the first buffer and a third field stored in the third buffer;
a motion compensator that compensates for a motion between the first field and the third field using the motion vector estimated by the motion estimator to thereby generate an interpolated field;
an output unit that outputs at least one of the interpolated field generated by the motion compensator and a second field stored in the second buffer; and
a field selector that selects a field to be output from the output unit according to a film mode of the sequentially incoming video fields.

2. The image conversion apparatus as claimed in claim 1, wherein the field selector comprises:
a film mode determiner that determines whether the sequentially incoming video fields are in a 3:2 pull down film mode, a 2:2 pull down film mode, or not in a pull down film mode; and
a selection signal output unit that outputs a selection signal to select one of the interpolated field and a second field stored in the second buffer according the determination of the film mode determiner.

3. The image conversion apparatus as claimed in claim 2, wherein, if the sequentially incoming video fields are in the 3:2 pull down mode, the selection signal output unit outputs a selection signal to control the output unit to output a last fields of repeated fields of the sequentially incoming fields as the interpolated field.

4. The image conversion apparatus as claimed in claim 2, wherein, if the sequentially incoming video fields are in the 2:2 pull down film mode, the selection signal output unit outputs a selection signal to control the output unit to output the interpolated field in every second field.

5. The image conversion apparatus as claimed in claim 2, wherein, if the sequentially incoming fields are not in a pull down film mode, the selection signal output unit outputs a selection signal to control the output unit to output the second field which is not interpolated.

6. The image conversion apparatus as claimed in claim 1, wherein the motion estimator estimates a motion by performing a block matching algorithm.

7. The image conversion apparatus as claimed in claim 6, wherein the motion estimator estimates a motion by using the following equation that linearly approximates to the Lorentzian function:

$$E_m(v_m) = \sum_{x \in R(B_m)} \varphi_D(f_{k+1}(x) - f_{k-1}(x - v_m)) + \lambda_m \sum_{v' \in V_N(m)} \varphi_S(v' - v_m)$$

wherein $f_{k+1}(x)$ denotes a pixel value in an image coordinate vector x of a field k+1 that is the third field, $V_m$ denotes a motion vector of a current block m, R(Bm)

denotes the union of sets image coordinate vectors of the block m in the third field, $V_N(m)$ denotes the unit of sets neighboring blocks around the current block m, $\lambda_m$ denotes a motion smoothness weight, $\phi_s$ denotes a motion smoothness error function, and $\phi_D$ denotes a matching error function.

8. The image conversion apparatus as claimed in claim 7, wherein at least one of the motion smoothness error function and the matching error function is calculated using the following equation:

$$\varphi = \left|\frac{Lorentizian(T, \sigma)}{T}\right|_{if\ |x|<T}$$

otherwise $\phi$=Lorentzian(T,$\sigma$)

wherein T denotes a maximum pixel value.

9. The image conversion apparatus as claimed in claim 7, wherein the motion smoothness weight adaptively varies depending on a block.

10. The image conversion apparatus as claimed in claim 1, wherein the motion compensator performs a bilinear interpolation.

11. A method for converting an image format of an image conversion apparatus comprising a first buffer, a second buffer and a third buffer, the method comprising:
sequentially storing video fields in the first, second and third buffers;
calculating a motion vector using a first field stored in the first buffer and a third field stored in the third buffer;
compensating a motion between the first field and the third field using the motion vector to generate an interpolated field;
determining a film mode of the video fields; and
outputting a second field stored in the second buffer or the interpolated field according to the film mode.

12. The method as claimed in claim 11, wherein the outputting the second field or the interpolated field comprises outputting a last one of repeated fields of the video fields as the interpolated field if the video fields are in a 3:2 pull down film mode.

13. The method as claimed in claim 11, wherein the outputting the second field or the interpolated field comprises outputting the interpolated field in every second field if the video fields are in a 2:2 pull down film mode.

14. The method as claimed in claim 11, wherein the outputting the second field or the interpolated field comprises outputting the second field stored in the second buffer if the video fields are not in a pull down film mode.

15. The method as claimed in claim 11, wherein the calculating the motion vector comprises estimating a motion by performing a block matching algorithm.

16. The method as claimed in claim 11, wherein the calculating the motion vector comprises estimating a motion by using the following equation that linearly approximates to the Lorentzian function:

$$E_m(v_m) = \sum_{x \in R(B_m)} \varphi_D(f_{k+1}(x) - f_{k-1}(x - v_m)) + \lambda_m \sum_{v' \in V_N(m)} \varphi_S(v' - v_m)$$

wherein $f_{k+1}(x)$ denotes a pixel value in an image coordinate vector x of a field k+1 that is the third field, $V_m$ denotes a motion vector of a current block m, R(Bm) denotes the union of sets image coordinate vectors of the block m in the third field, $V_N(m)$ denotes the unit of sets neighboring blocks around the current block m, $\lambda_m$ denotes a motion smoothness weight, $\phi_s$ denotes a motion smoothness error function, and $\phi_D$ denotes a matching error function.

17. The method as claimed in claim 16, wherein at least one of the motion smoothness error function and the matching error function is calculated using the following equation:

$$\varphi = \left|\frac{Lorentizian(T, \sigma)}{T}\right|_{if\ |x|<T}$$

otherwise $\phi$p=Lorentzian(T,$\sigma$)

wherein T denotes a maximum pixel value.

18. The method as claimed in claim 16, wherein the motion smoothness weight adaptively varies depending on a block.

19. The method as claimed in claim 11, wherein the interpolating comprises a bilinear interpolation.

* * * * *